May 5, 1970   L. D. PHILLIPS   3,509,890
SPRING BIASED GASKET FOR BATH HOUSING
Filed March 18, 1968   2 Sheets-Sheet 1

INVENTOR.
L. D. PHILLIPS
BY
Young & Quigg
ATTORNEYS

United States Patent Office 3,509,890
Patented May 5, 1970

3,509,890
SPRING BIASED GASKET FOR BATH HOUSING
Lawrence D. Phillips, Bartlesville, Okla., assignor to Phillips Petroleum Company, a corporation of Delaware
Filed Mar. 18, 1968, Ser. No. 713,860
Int. Cl. B05c 3/15
U.S. Cl. 134—122            6 Claims

ABSTRACT OF THE DISCLOSURE

The outlet in a fluid bath enclosure is provided with a gasket member having an opening therethrough which is smaller than the cross section of an elongated cylindrical article being treated, for example extruded tubing. A spring member is positioned on the downstream side of the gasket member and has a plurality of fingers extending radially toward the elongated axis of the article, with a seal retaining pin extending upstream from each finger into biasing contact with the gasket member.

---

This invention relates to an improved fluid tight seal on a bath housing. It is often desirable to pass elongated cylindrical articles, such as tubing, through a bath for heating, cooling, pickling, electroplating and the like. One problem in the continuous process of treating such articles in a bath housing is to prevent leakage of fluid from the housing at the inlet and outlet of the housing.

It is an object of the invention to provide a new and improved gasket means for a bath housing. Another object of the invention is to minimize, if not prevent, leakage of fluid from a bath housing. Yet another object of the invention is to increase the resiliency of a gasket member.

Other objects, aspects and advantages of the invention will be apparent from a study of the specification, the drawings and the appended claims to the invention.

Figure 3:
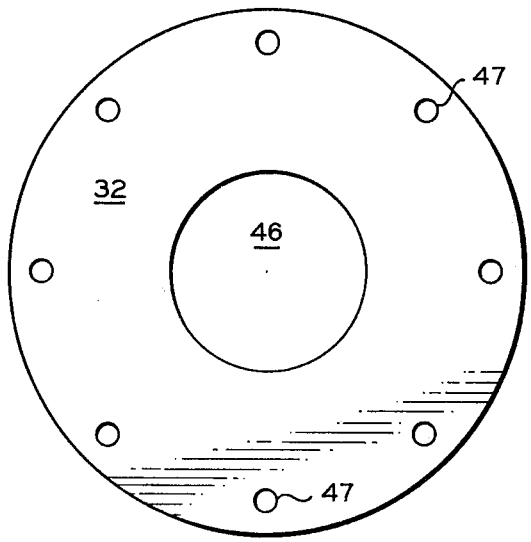
Figure 4:
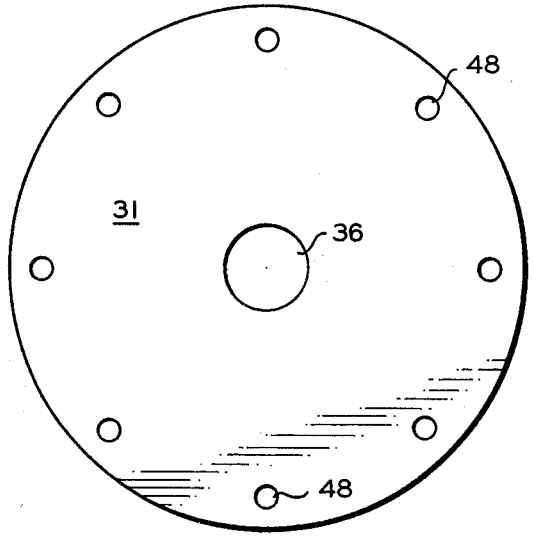
Figure 5:
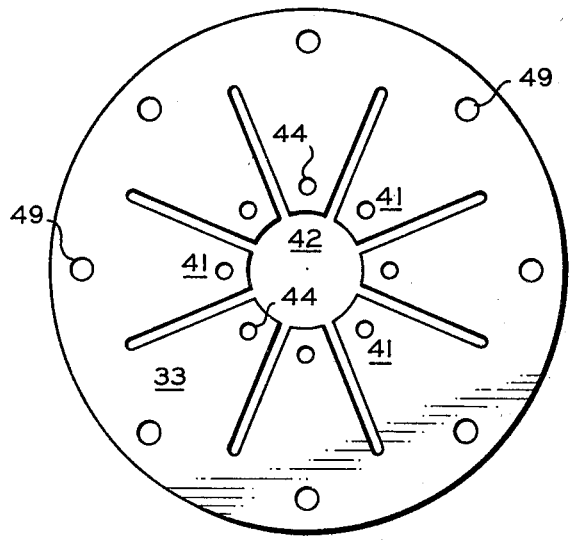
Figure 1:
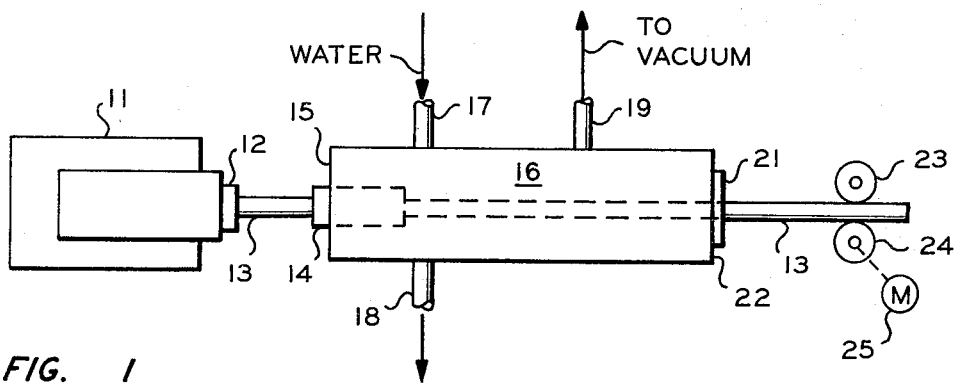
Figure 2:
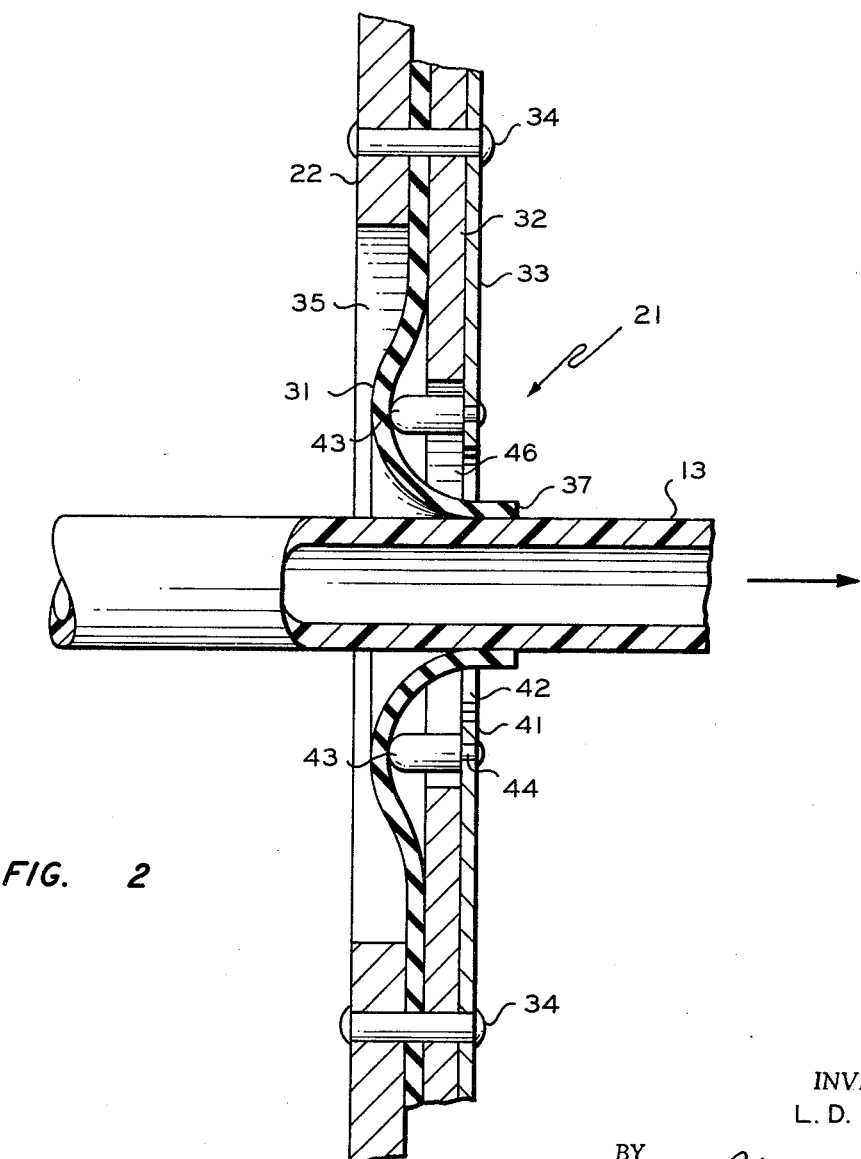

In the drawings, FIG. 1 is a diagrammatic side elevational view of one form of apparatus embodying the invention, FIG. 2 is an enlarged side elevational view of a part of the outlet wall of the bath housing of FIG. 1. FIGS. 3, 4 and 5 are end elevational views of the support plate, the gasket member and the spring member of the structure of FIG. 2.

Referring now to FIG. 1, extruder 11 is provided with a die 12 for the extrusion of tubing 13. The extruded tubing, still in a molten condition, is passed through a sizing sleeve 14, mounted in the inlet end wall 15 of a gas-tight water bath housing 16. Cooling water is passed through conduit 17 into housing 16 and warmed water is withdrawn by way of conduit 18. Conduit 19 connects the interior of housing 16 to a vacuum means to maintain the pressure in chamber 16 at a subatmospheric value. The interior of tubing 13 is exposed to the atmosphere, thus creating a differential which urges the tubing against the sizing surface of sleeve 14. The cooled tubing passes through gasket 21, mounted in the outlet end wall 22 of housing 16, and between rollers 23 and 24. Roller 24 is driven by motor 25 to apply tension along the longitudinal axis of tubing 13 for pulling the tubing through the water bath.

Referring now to FIGS. 2–5, flexible gasket member 31, support plate 32 and spring means 33 are secured to outlet end wall 22 by rivets or bolts 34. Wall 22 has an outlet opening 35 which has a diameter substantially greater than the outer diameter of tubing 13. Gasket member 31 is larger than the outlet opening 35 and is securely positioned over outlet opening 35. Gasket member 31 has a circular opening 36 therethrough for the passage of tubing 13 through the gasket member. The diameter of opening 36 is substantially less than the external diameter of tubing 13 so that the passage of tubing 13 through opening 36 deforms member 31 to produce a substantially annular portion 37 of member 31 coaxial with tubing 13 and having an inner diameter which resiliently conforms to the outer diameter of tubing 13.

Spring means 33 is provided with a plurality of spring fingers 41 which extend radially toward the center of opening 42, which is greater in cross section, or in other words has a larger diameter, than tubing 13 but smaller in cross section than opening 35. Seal retaining pins 43 are secured to fingers 41 by staking, riveting or bolting through openings 44 in the inner portions of fingers 41. It is presently preferred that pins 43 be equally spaced with at least one seal retaining pin per spring finger. Seal retaining pins 43 extend upstream, with respect to the direction of movement of tubing 13, into contact with gasket member 31 to resiliently bias member 31 in the direction opposite to the direction of movement of tubing.

Support plate 32 can be employed to support the outer region of gasket member 31. This permits opening 35 to be sufficiently large to accommodate the desired range in different diameter sizes for tubing 13. Plate 32 has an opening 46 which is smaller than opening 35 but sufficiently large to permit seal retaining pins to contact gasket member 31. Plate 32 is provided with openings 47 to receive bolts 34, and gasket member 31 and spring member 33 are provided with corresponding bolt holes 48 and 49, respectively. Support plate 32 is positioned between gasket member 31 and spring means 33, with the spring means 33 being on the downstream side. It is desirable that member 31, plate 32 and spring means 33 be positioned such that openings 36, 46 and 42 are substantially coaxial with tubing 13 and opening 35. Without spring means 33, the movement of the tubing 13 would extend gasket member 31 to its full extent. The effectiveness of the seal between gasket member 31 and tubing 13 would depend only on the residual resiliency of member 13. In these circumstances, any distortions in the shape of tubing 13 or any tendency of member 31 to bind on tubing 13 would frequently result in leakage of water from the bath housing between the gasket member 31 and tubing 13. The utilization of spring means 33 increases the resiliency of the gasket to provide a greater reserve capacity which will prevent or substantially eliminate such leaks. Pins 43 are employed to provide for contact between spring means 33 and gasket member 31 only at spaced points of relatively small area to prevent binding which could otherwise occur. The contact surface of pins 43 is rounded to prevent pins 43 digging into member 31. Pins 43 are uniformly spaced with respect to the longitudinal axis of the tubing 13 and with respect to the distance between adjacent pins.

While the invention has been described in terms of a water bath in a tubing extrusion process, it is applicable to other systems wherein elongated substantially cylindrical articles are passed through a bath housing. The bath can be for heating, cooling, etching, cleaning, plating, pickling, or the like. While gasket member 31 can be made of any suitable flexible material, silicone rubber has been found satisfactory for many purposes. Plate 32 and pins 43 can be formed of any suitable rigid material, for example aluminum. Spring means 33 can be formed of any material possessing sufficient resiliency, for example Phosphor bronze.

Reasonable variations and modifications are possible within the scope of the foregoing disclosure and the drawings.

I claim:

1. Apparatus comprising a bath housing for treating an elongated substantially cylindrical article, and having an inlet opening and an outlet opening larger in diameter than the outer diameter of said article, a flexible gasket member larger than said outlet opening and securely positioned over said outlet opening, said gasket member having a circular opening therethrough for the passage of said article through said gasket member, the diameter of said circular opening being substantially less than said outer diameter of said article so that the passage of said article through said circular opening deforms said gasket member to produce a substantially annular portion of said gasket member coaxial with said article and having an inner diameter conforming to the outer diameter of said article, spring means having a plurality of spring fingers extending radially toward the center of an opening through said spring member, said opening in said spring member being greater in cross section than said article but less in cross section than said outlet opening in said bath housing, means for securing said spring means to said bath housing downstream, with respect to the direction of movement of said article, of said gasket member with said opening in said spring member being substantially coaxial with said circular opening, at least one retaining pin secured to the inner end portion of each of said spring fingers and extending upstream, with respect to the direction of movement of said article, into contact with said gasket member to resiliently bias said gasket member in the direction opposite to the direction of movement of said article.

2. Apparatus in accordance with claim 1 further comprising a support plate positioned between said gasket member and said spring means, said support plate having an opening therethrough smaller than said inlet opening of said bath housing but sufficiently large to permit said retaining pins to resiliently contact said gasket member.

3. Apparatus in accordance with claim 2 wherein each of said retaining pins is rounded in the area of contact with said gasket member.

4. Apparatus in accordance with claim 3 wherein said retaining pins are uniformly spaced from the longitudinal axis of said article, and are uniformly spaced with respect to the distance between adjacent pins.

5. Apparatus in accordance with claim 4 wherein said gasket member is rubber.

6. Apparatus in accordance with claim 5 further comprising means for introducing a fluid into said bath housing and means for removing fluid from said bath housing.

References Cited

UNITED STATES PATENTS

| | | |
|---|---|---|
| 1,885,080 | 10/1932 | Cherry et al. |
| 2,246,591 | 6/1941 | Hubbard _____ 277—49 |
| 2,273,962 | 2/1942 | Hubbard _____ 277—49 |
| 3,044,098 | 7/1962 | Stalson _____ 134—64 XR |

FOREIGN PATENTS 492,954    9/1938    Great Britain.

ROBERT L. BLEUTGE, Primary Examiner

U.S. Cl. X.R.

277—102, 149, 152